(12) United States Patent
Ernst et al.

(10) Patent No.: US 7,158,847 B2
(45) Date of Patent: Jan. 2, 2007

(54) SYSTEM AND METHOD FOR DETERMINING COMPONENTS OF A BLENDED PLASTIC MATERIAL

(75) Inventors: Todd C. Ernst, Tallmadge, OH (US); Alan C. Ernst, Perrysburg, OH (US)

(73) Assignee: Advanced Blending Technologies, LLC, Perrysburg, OH (US)

( * ) Notice: Subject to any disclaimer, the term of this patent is extended or adjusted under 35 U.S.C. 154(b) by 280 days.

(21) Appl. No.: 10/796,648

(22) Filed: Mar. 9, 2004

(65) Prior Publication Data

US 2005/0203656 A1  Sep. 15, 2005

(51) Int. Cl.
*G06F 19/00* (2006.01)

(52) U.S. Cl. ....................... 700/106; 700/265

(58) Field of Classification Search ............ 700/106, 700/266, 265, 117
See application file for complete search history.

(56) References Cited

U.S. PATENT DOCUMENTS

| | | | |
|---|---|---|---|
| 3,560,725 A | 2/1971 | Claxton et al. | |
| 3,628,004 A | 12/1971 | Claxton et al. | |
| 5,223,714 A | 6/1993 | Maggard | |
| 5,430,295 A | 7/1995 | Le Febre et al. | |
| 5,796,251 A | 8/1998 | Le Febre et al. | |
| 5,888,256 A | 3/1999 | Morrison | |
| 6,258,987 B1 | 6/2001 | Schmidt et al. | |
| 6,411,945 B1 | 6/2002 | Nakajima | |
| 6,611,735 B1 | 8/2003 | Henly et al. | |
| 6,804,567 B1 * | 10/2004 | Shadow et al. ............... | 700/97 |
| 2002/0049667 A1 | 4/2002 | Navani et al. | |
| 2003/0065408 A1 | 4/2003 | Quinones et al. | |
| 2003/0084791 A1 | 5/2003 | Trenhaile et al. | |

* cited by examiner

*Primary Examiner*—Zoila Cabrera
(74) *Attorney, Agent, or Firm*—Calfee, Halter & Griswold LLP

(57) ABSTRACT

Methods and systems are disclosed for determining plastic components of a blended plastic material. According to a method of the present invention, a blending computer access supply data describing characteristics of each of a plurality of plastic components. The blending computer receives specification data which identifies at least one desired characteristic of the blended plastic material. The blending computer processes the supply data and the specification data to determine combinations of certain of the plastic components that may produce the blended plastic material having the at least one desired characteristic. The blending computer determines, for each combination, a preferred percentage of each of the plastic components of the combination, and reports the combinations and preferred percentages.

34 Claims, 18 Drawing Sheets

| ID | Material Type | Vendor | Product | MI | Flex | Izod | NCTL | R1 | R2 | R3 | PP Percent | Min Percent | Max Percent | Available lbs | Cost |
|---|---|---|---|---|---|---|---|---|---|---|---|---|---|---|---|
| 1 | Prime | Equistar | 4689 | 0.14 | 178 | 3 | 102 | 43 | 32 | 180 | 0 | 0 | 100 | 180000 | 0.45 |
| 2 | Prime | CPChem | 9656 | 0.46 | 201 | 2.1 | 27 | 15 | 30 | 306 | 0 | 0 | 100 | 90000 | 0.43 |
| 3 | Prime | Exxon | 249 | 0.34 | 139 | 3.2 | 25 | 32 | 41 | 312 | 0 | 0 | 100 | 180000 | 0.41 |

Edit Components | Edit Constraints | Report | Report Detail

FIGURE 9

| Solution | MI | Flex | Izod | NCTL | R1 | R2 | R3 | PPIPercent | Cost | BlendPounds |
|---|---|---|---|---|---|---|---|---|---|---|
| 1 | 0.39 | 188 | 2.7 | 32 | 33.5 | 37.5 | 226 | 0 | 0.404 | 225028 |
| 2 | 0.347 | 185 | 2.8 | 37 | 36.3 | 37.7 | 214 | 0 | 0.406 | 225028 |
| 3 | 0.358 | 191 | 2.7 | 37 | 34.6 | 36.6 | 213 | 0 | 0.408 | 225028 |
| 4 | 0.382 | 185 | 2.4 | 30 | 21.5 | 32.6 | 295 | 0 | 0.427 | 132498 |

FIGURE 11

| Solution 1 | | | | | | | | | | | | | | | |
|---|---|---|---|---|---|---|---|---|---|---|---|---|---|---|---|
| ID | Material Type | Vendor | Product | MI | Flex | Izod | NCTL | R1 | R2 | R3 | PP Percent | Cost | Available Lbs | Used Lbs | Remaining Lbs | Percentage |
| 2 | Prime | CPChem | 9656 | 0.46 | 201 | 2.1 | 27 | 15 | 30 | 306 | 0 | 0.43 | 90000 | 22503 | 67497 | 10 |
| 1 | Prime | Exxon | 249 | 0.34 | 139 | 3.2 | 25 | 32 | 41 | 312 | 0 | 0.41 | 180000 | 22503 | 157497 | 10 |
| A | WebBuy | Formosa | 3452 | 0.39 | 192 | 2.7 | 34 | 36 | 38 | 206 | 0 | 0.40 | 180000 | 180000 | 0 | 80 |

Edit Components | Edit Constraints | Report | Report Detail

FIGURE 12

| ID | Material Type | Vendor | Product | MI | Flex | Izod | NCTL | R1 | R2 | R3 | PP Percent | Min Percent | Max Percent | Available Lbs | Cost |
|----|---------------|----------|---------|------|------|------|------|----|----|-----|------------|-------------|-------------|---------------|------|
| 1  | Prime         | Equistar | 4689    | 0.14 | 178  | 3    | 102  | 43 | 32 | 180 | 0          | 0           | 100         | 180000        | 0.45 |
| 2  | Prime         | CPChem   | 9656    | 0.46 | 201  | 2.1  | 27   | 15 | 30 | 306 | 0          | 0           | 100         | 90000         | 0.43 |
| 3  | Prime         | Exxon    | 249.73  | 0.34 | 139  | 3.2  | 25   | 32 | 41 | 312 | 0          | 0           | 100         | 180000        | 0.41 |

Edit Components | Edit Constraints | Component to Cost | Report | Report Detail

| Min/Max | MI | Flex | Izod | NCTL | R1 | R2 | R3 | PP Percent | Percent Material | Combinations | Desired Blend Cost |
|---|---|---|---|---|---|---|---|---|---|---|---|
| Minimum | 0.3 | 185 | 2 | -24 | 20 | 25 | 175 | 0 | 10 | 3 | 0.4275 |
| Maximum | 0.5 | 195 | 5 | [null] | 40 | 40 | 310 | 1 | 100 | 3 | |

1410

| Edit Components | Edit Constraints | Component to Cost | Report | Report Detail |

| ID | Material Type | Vendor | Product | MI | Flex | Izod | NCTL | R1 | R2 | R3 | PP Percent | Min Percent | Max Percent | Available Lbs. |
|----|---------------|--------|---------|------|------|------|------|----|----|-----|------------|-------------|-------------|----------------|
| 2A | Prime | Dow | 5109 | 0.31 | 189 | 2 | 88 | 32 | 37 | 183 | 0 | 0 | 100 | 180000 |

Edit Components | Edit Constraints | Component to Cost | Report | Report Detail

1500

| Solution | MI | Flex | Izod | NCTL | R1 | R2 | R3 | PP Percent | Cost | Blend Pounds |
|---|---|---|---|---|---|---|---|---|---|---|
| 1 | 0.3 | 189 | 2.1 | 78 | 35.8 | 35.7 | 197 | 0 | 0.4275 | 230221 |

Edit Components | Edit Constraints | Component to Cost | Report | Report Detail

| ID | Material Type | Vendor | Product | MI | Flex | Izod | NCTI | R1 | R2 | R3 | PP Percent | Cost | Available Lbs | Used Lbs | Remaining Lbs | Percentage |
|----|---------------|--------|---------|------|------|------|------|----|----|-----|------------|-------|---------------|----------|---------------|------------|
| 2A | Prime | Dow | 5109 | 0.31 | 189 | 2 | 88 | 32 | 37 | 183 | 0 | 0.424 | 180000 | 180000 | 0 | 78.2 |
| 1 | Prime | Equistar | 4689 | 0.14 | 178 | 3 | 102 | 43 | 32 | 180 | 0 | 0.450 | 180000 | 23022 | 156978 | 10.0 |
| 2 | Prime | CPChem | 9656 | 0.46 | 201 | 2.1 | 27 | 15 | 30 | 306 | 0 | 0.430 | 90000 | 27176 | 62824 | 11.8 |

1710

| Edit Components | Edit Constraints | Component to Cost | Report | Report Detail |

SYSTEM AND METHOD FOR DETERMINING COMPONENTS OF A BLENDED PLASTIC MATERIAL

TECHNICAL FIELD

The systems, methods, and computer readable media described herein relate generally to optimizing and/or determining components of a blended plastic material.

BACKGROUND

The creators of blended plastic materials, known in the industry as converters, typically purchase single component incoming material streams directly from resin suppliers, with little or no testing of the incoming raw materials. Converters generally assume that the incoming materials meet or exceed the physical properties of the product and process requirements. In some cases, the incoming materials will vary in one or more critical physical properties creating a hardship for the converter. Such materials may be returned to the supplier or reduced in price as a concession and blended into a finished product formulation at low concentrations so as not to materially affect the required physical properties or processing of the finished product.

It is also common practice today that many converters use wide specification, recycled post-industrial, recycled post-consumer and/or reprocessed resins in the production of numerous products. Traditionally, the use of post-industrial recycled resins, and to a greater extent recycled post-consumer resins, has been limited to non-critical applications or used at relatively low percentages due to the degradation of blended material properties or processing of the finished product. Low percentages of previously used materials included in the finished compound or reduced quality have been the norm due to a limited understanding of how to blend two or more materials together to alter the finished blend to meet the desired physical properties and not reduce processing efficiencies. The technology embodied in this invention may permit the converter to use up to 100% recycled post-consumer, wide specification, recycled and/or reprocessed resins or any combination aforementioned while achieving the desired finished product physical properties and processing characteristics.

A need presently exists in the industry for a method and system which optimize the physical properties of finished plastic products in relation to cost. Typically, the objective of blending two or more materials together is to achieve the desired properties of one polymer, for example, combined with the desired properties of a second polymer and so on. Rather than synthesizing a new polymer with all the desired properties, two or more polymers may be identified and mixed together to form a finished new blend that will have all of the desired properties, at the molecular level. The objective remains to produce the highest quality product at desire physical properties and maintain or improve processability, at the least cost. Current technology does not provide for a method to determine a relative value of a component in relation to one's physical properties within a blend or database.

SUMMARY

The following presents a simplified summary of methods, systems, and computer readable media associated with optimizing and/or determining components of a blended plastic material to facilitate providing a basic understanding of these items. This summary is not an extensive overview and is not intended to identify key or critical elements of the methods, systems, and computer readable media or to delineate the scope of these items. This summary provides a conceptual introduction in a simplified form as a prelude to the more detailed description that is presented later.

According to a first aspect of the present invention, a method is disclosed for determining plastic components of a blended plastic material. The method includes accessing supply data describing characteristics of each of a plurality of plastic components. The method also includes receiving specification data which identifies at least one desired characteristic of the blended plastic material. The method further includes processing the supply data and the specification data to determine combinations of certain of the plastic components that may produce the blended plastic material having the at least one desired characteristic. The method still further includes determining, for each combination, a preferred percentage of each of the plastic components of the combination, and reporting the combinations and preferred percentages.

According to a second aspect of the present invention, a method is disclosed for determining a plastic component of a blended plastic material. The method includes accessing supply data describing characteristics of each of a plurality of plastic components. The method also includes receiving specification data which identifies at least one desired characteristic of the blended plastic material. The method further includes receiving presumed plastic component data identifying a portion of ingredients of the blended plastic material.

According to the method, supply data is processed. The presumed plastic component data and the specification data is processed to determine combinations of one or more plastic components that may be combined with the components identified by the presumed plastic component data to produce the blended plastic material having the desired characteristic(s). For each combination, a preferred percentage of each of the plastic components of the combination is determined, and the combinations and preferred percentages are reported.

An advantage of the present invention is that it enables a reduction in the cost of blended plastic materials having particular characteristics.

Another advantage of the present invention is that it enables improved physical performance and processability of a finished product.

A further advantage of the present invention is that it enables a value to be placed on an component's contribution of physical properties in relation to the physical properties of other blend components and their cost.

An additional advantage of the present invention is that it provides a method to facilitate the design of a multi-component blend solution when at least one component is unknown.

Yet a further advantage of the present invention is that it provides a method to routinely secure in line test specimens, compare the sample to the blend specifications and refine the blend if needed. This process may be continuous and provides for real time quality control and cost efficiency.

These as well as other objects, features and advantages of the present invention are readily apparent from the following description of illustrative example methods, systems, and computer readable media which are described herein in connection with the following description and the annexed drawings. These examples are indicative, however, of but a few of the various ways in which the principles of the methods, systems, computer readable media and so on may be employed and thus are intended to be inclusive of equivalents. Other advantages and novel features may become apparent from the following detailed description when considered in conjunction with the drawings.

BRIEF DESCRIPTION OF THE DRAWINGS

Comprehension of the invention is facilitated by reading the following detailed description, in conjunction with the associated drawings, in which:

FIGS. 9–12 are example computer windows which may be employed by the control logic of the blending computer to enable the use of remote supply data; and FIGS. 13–17 are example computer windows which may be employed by the control logic of the blending computer to provide preferred material valuation.

DETAILED DESCRIPTION

Figure 1A:
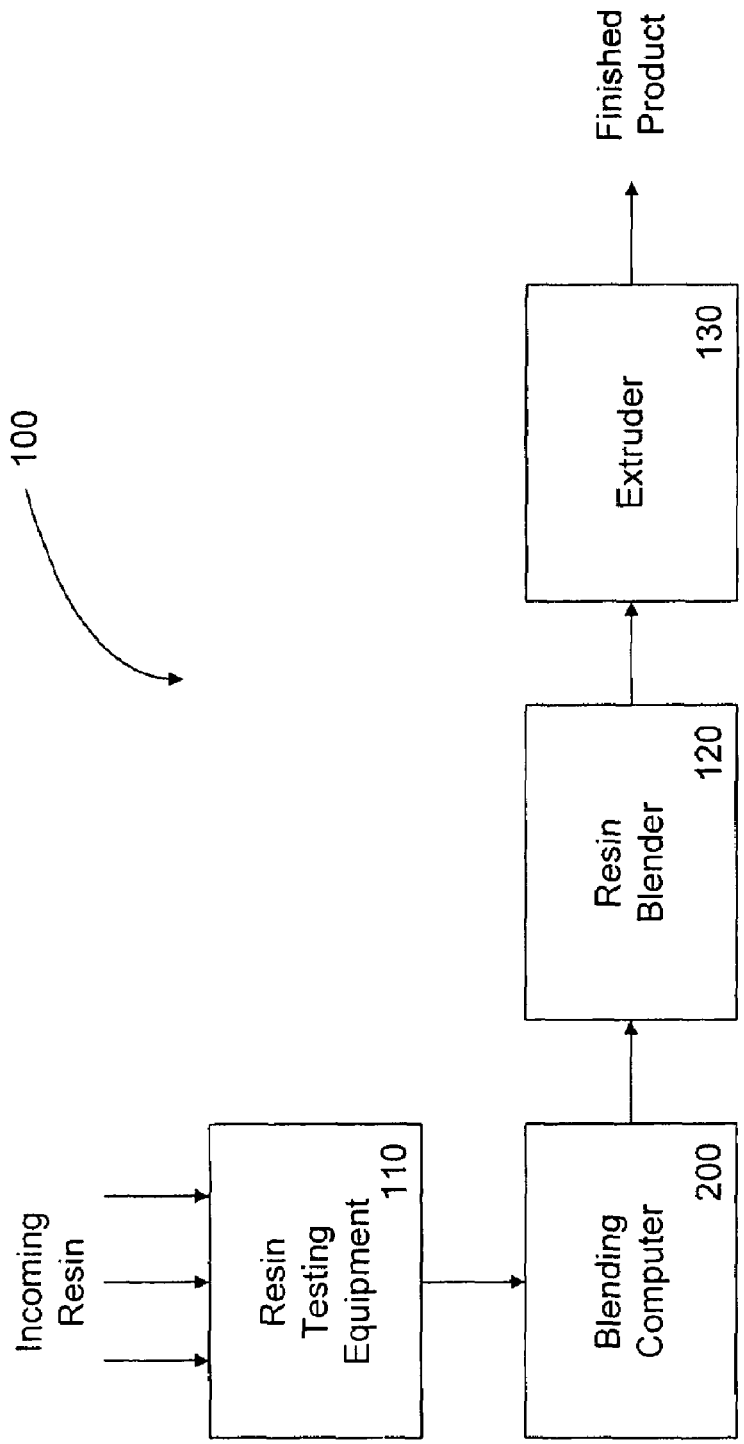
FIG. 1A is a block diagram illustrating a first example operating environment in accordance with the present invention.

Example systems, methods, computer media, and so on are now described with reference to the drawings, where like reference numerals are used to refer to like elements throughout. In the following description for purposes of explanation, numerous specific details are set forth in order to facilitate thoroughly understanding the methods, systems and computer readable media. It may be evident, however, that the methods, systems and computer readable media can be practiced without these specific details. In other instances, well-known structures and devices are shown in block diagram form in order to simplify description.

Some portions of the detailed descriptions that follow are presented in terms of algorithms and symbolic representations of operations on data bits within a computer memory. These algorithmic descriptions and representations are the means used by those skilled in the data processing arts to convey the substance of their work to others skilled in the art. An "algorithm" is here, and generally, conceived to be a self-consistent sequence leading to a desired result. The sequence includes actions like those requiring physical manipulations of physical quantities. Usually, though not necessarily, these quantities take the form of chemical, biological, electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise as apparent from the following discussions, it is appreciated that throughout the description, discussions utilizing terms like processing, computing, calculating, determining, displaying, or the like, refer to the action and processes of a computer system, computer component, logic, or similar electronic computing device, that manipulates and transforms data represented as physical (electronic) quantities within the computer system's registers and memories into other data similarly represented as physical quantities within the computer system memories or registers or other information storage, transmission or display devices.

It will be appreciated that some or all of the processes and methods of the system involve electronic and/or software applications that may be dynamic and flexible processes so that they may be performed in sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor (DSP), a software controlled microprocessor, or an ASIC. Components implemented as software are not limited to any particular programming language. Rather, the description herein provides the information one skilled in the art may use to fabricate circuits or to generate computer software and/or computer components to perform the processing of the system. It will be appreciated that some or all of the functions and/or behaviors of the present system and method may be implemented as logic as defined above.

Referring to FIG. 1A, there is illustrated a first example operating environment 100 for systems and methods for determining components of a blended plastic material in accordance with the present invention. As illustrated, environment 100 includes resin testing equipment 110 which receives incoming component resins. Testing equipment 110 may include capillary, oscillating or rotational rheometer, density column, melt flow indexer, infrared spectrophotometer, impact tester, and the like and may be used to test the incoming resins to determine any of various properties. The determined resin properties associated with the incoming resin are supplied to blending computer 200. Generally, such resin properties may reflect, among other things, mechanical, electrical, thermal, polymeric, aging, flammability, optical, rheological, chemical resistance, and color properties of the resin or plastic component. More specific properties include, for example, melt index, density, Theological characterization, molecular weight, molecular weight distribution, impact strength, tear strength, tensile strength, compression strength, slow crack growth resistance, rapid crack growth resistance, melt strength, processibility, die swell, creep resistance, flexural strength, flexural modulus, elongation, melting point, dielectric strength, contamination, post-consumer grade characterization, post industrial grade characterization, virgin grade characterization, color, and hardness. This list of properties is merely representative, and other specific properties may be readily identified by those of ordinary skill in the art. For example, other specific properties may be identified in "Handbook of Polymer Testing: Physical Methods" by Roger Brown and published in 1999 by Marcel Dekker, and "Handbook of Plastics Testing Technology, 2nd Edition" by Vishu Shah, published in 1998. The entirety of each of these texts is incorporated herein by reference.

When used in environment 100, blending computer 200 includes control logic for determining and/or optimizing components of blended plastic materials based on specifications provided by a user and on supply data describing the incoming resins. The blending computer 200 uses the specification data and supply data to determines an appropriate list of plastic components which may be used by a resin blender 120 to create the composite material. In one embodiment, the identification of the plastic components and respective percentages are manually entered into resin blender 120. In another embodiment, blending computer 200 transmits the identification of the plastic components and respective percentages directly to resin blender 120. The composite material created by resin blender 120 may be provided to extruder 130 which forms the composite material into a finished product or compound.

Figure 1B:
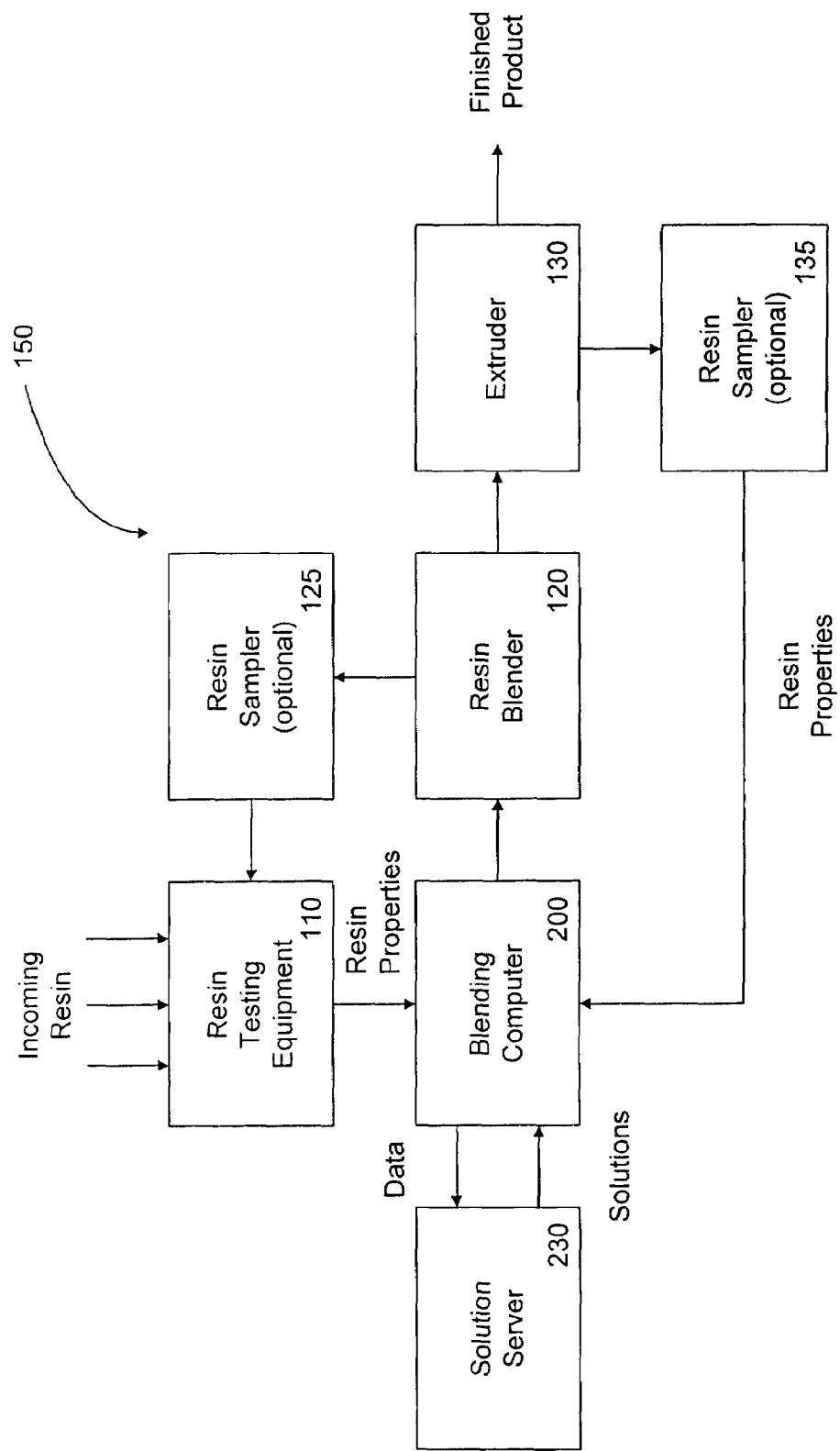
FIG. 1B is a block diagram illustrating a second example operating environment in accordance with the present invention.

Referring to FIG. 1B, there is illustrated a second example operating environment 150 for systems and methods for determining components of a blended plastic material in accordance with the present invention. Like environment 100, environment 150 includes resin testing equipment 110, resin blender 120 and extruder 130.

One distinction between operating environments 100 and 150 is that operating environment 150 is configured to determine blending solutions remotely, with blending computer 200 operating as a client to blending server 230. Blending computer 200 includes control logic for collecting blending parameters and reporting solutions. Blending parameters are collected from a user by blending computer 200 and transmitted to solution server 230. Solution server 230 processes the data received from blending computer 200 and returns solution data to blending computer 200. The solutions are then provided to the user via blending computer 200.

Another illustrated distinction between operating environments 100 and 150 is the addition of optional production monitors, such as resin samplers 125 and 135. As illustrated, resin sampler 125 obtains samples of the blended resin prior to extrusion and provides the resin samples to resin testing equipment 110 or comparable testing equipment integrated with sampler 125. The resin properties are then fed back to blending computer 200 to enable further refinement and/or calibration of the component percentages so as to produce a blended plastic material within tight tolerances of the specifications initially provided by the user. Resin sampler 125 may be a Dynisco on-line rheometer CMR III, a Dynisco on-line viscometer #ViscoSensor, or IMI on-line ultrasonic polymer monitor, or any other suitable sampling device known to those of skill in the art.

In addition to refining the component percentages, resin sampler 125 may be used to monitor the blended resin to determine any need for additives, enhancers and/or fillers to be included with the plastic components. The supply data may describe such additives, enhancers and/or fillers making selection of such non-plastic components readily available to the blending computer when determining the plastic blended material. Examples of additives include lubricants and other processing aids. Enhancers include, for example, UV stabilizers, antioxidants and heat stabilizers. Fillers include mineral fillers, wood fillers and fiber fillers, for example.

Environment 150 may also include resin sampler 135 positioned in-line after the extruder 130. Resin sampler 135 samples melted resin properties, and feeds the sampling data back to the blending computer for further refinement of the component percentages. Of course, resin sampler 135 may include certain integrated testing equipment in order to determine specific resin properties. Although not illustrated in FIG. 1A, it should be appreciated that environment 100 could be modified to include either resin sampler 125 or resin sampler 135, or both.

Blending System/Apparatus

Figure 2:
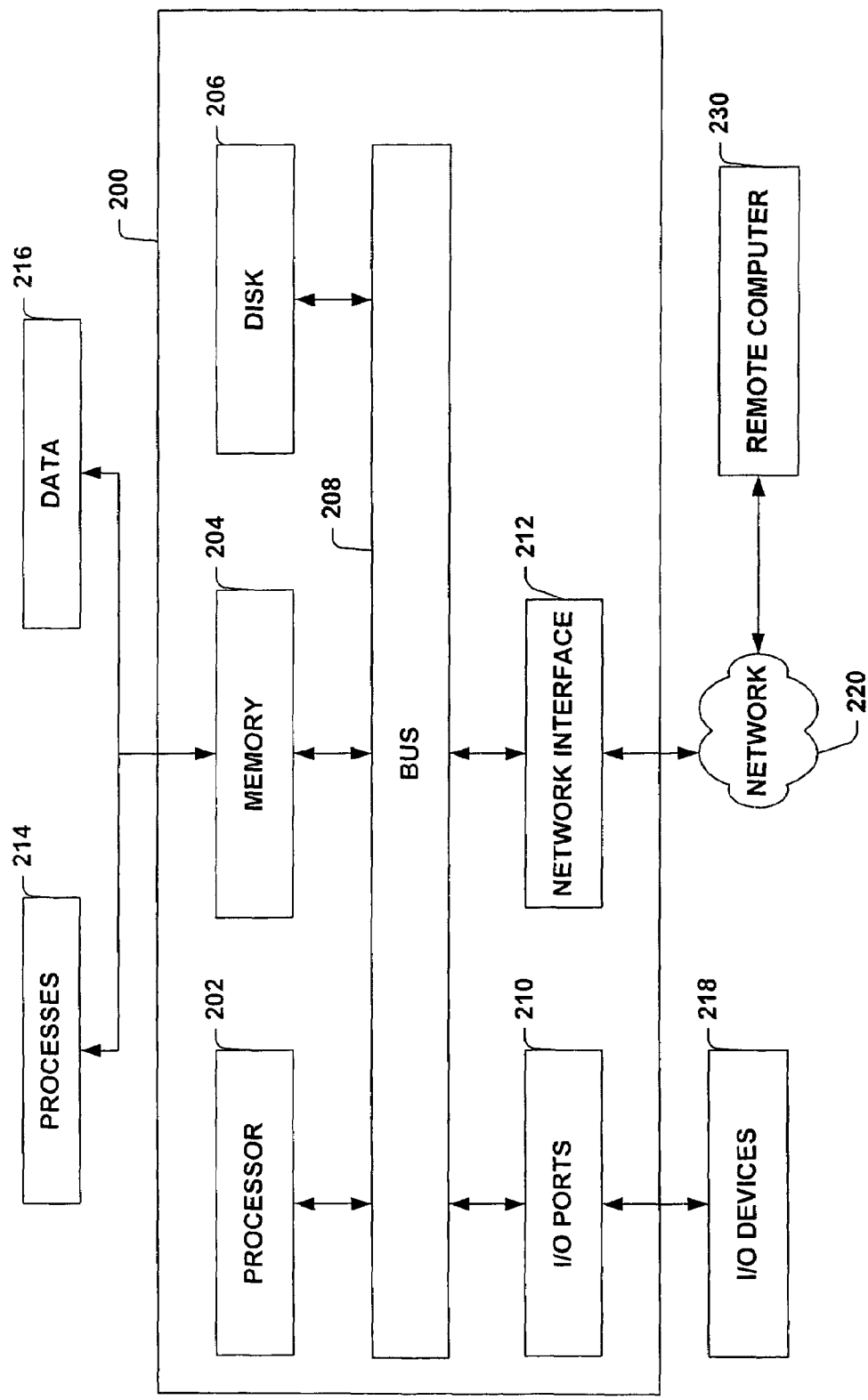
FIG. 2 is a block diagram illustrating an example blending computer of FIG. 1A.

In one example embodiment of the present invention, blending computer 200 may be a programmed general purpose computer as illustrated in FIG. 2. FIG. 2 illustrates computer 200 that includes a processor 202, a memory 204, a disk 206, input/output ports 210, and a network interface 212 operably connected by a bus 208. Executable components of the systems described herein may be located on a computer like computer 200. Similarly, computer executable methods described herein may be performed on a computer like computer 200. It is to be appreciated that other computers, such as solution server 230, for example, may also be employed with the systems and methods described herein.

The processor 202 can be a variety of various processors including dual microprocessor and other multi-processor architectures. The memory 204 can include volatile memory and/or non-volatile memory. The non-volatile memory can include, but is not limited to, read only memory (ROM), programmable read only memory (PROM), electrically programmable read only memory (EPROM), electrically erasable programmable read only memory (EEPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM). The disk 206 can include, but is not limited to, devices like a magnetic disk drive, a floppy disk drive, a tape drive, a Zip drive, a flash memory card, and/or a memory stick. Furthermore, the disk 206 can include optical drives like, a compact disk ROM (CD-ROM), a CD recordable drive (CD-R drive), a CD rewriteable drive (CD-RW drive) and/or a digital versatile ROM drive (DVD ROM). The memory 204 can store processes 214 and/or data 216, for example. The disk 206 and/or memory 204 can store an operating system that controls and allocates resources of the computer 200.

The bus 208 can be a single internal bus interconnect architecture and/or other bus architectures. The bus 208 can be of a variety of types including, but not limited to, a memory bus or memory controller, a peripheral bus or external bus, and/or a local bus. The local bus can be of varieties including, but not limited to, an industrial standard architecture (ISA) bus, a micro channel architecture (MSA) bus, an extended ISA (EISA) bus, a peripheral component interconnect (PCI) bus, a universal serial (USB) bus, and a small computer systems interface (SCSI) bus.

The computer 200 interacts with input/output devices 218 via input/output ports 210. Input/output devices 218 can include, but are not limited to, a keyboard, a pointing and selection device, various resin testing equipment 110, resin sampler 125, cameras, video cards, displays, and the like. The input/output ports 210 can include but are not limited to, serial ports, parallel ports, and USB ports.

The computer 200 can operate in a network environment and thus is connected to a network 220 by a network interface 212. Through the network 220, the computer 200 may be logically connected to a remote computer 222. The network 220 can include, but is not limited to, local area networks (LAN), wide area networks (WAN), and other networks. The network interface 212 can connect to local area network technologies including, but not limited to, fiber distributed data interface (FDDI), copper distributed data interface (CDDI), ethernet/IEEE 802.3, token ring/IEEE 802.5, and the like. Similarly, the network interface 212 can connect to wide area network technologies including, but not limited to, point to point links, and circuit switching networks like integrated services digital networks (ISDN), packet switching networks, and digital subscriber lines (DSL). Since the computer 200 can be connected with other computers, and since the systems and methods described herein may include distributed communicating and cooperating computer components, information may be transmitted between these components.

The systems, methods, and objects described herein may be stored, for example, on a computer readable media. Media can include, but are not limited to, an ASIC, a CD, a DVD, a RAM, a ROM, a PROM, a disk, a carrier wave, a memory stick, and the like.

Methodology for Determining Components of Blended Plastic

Figure 3:
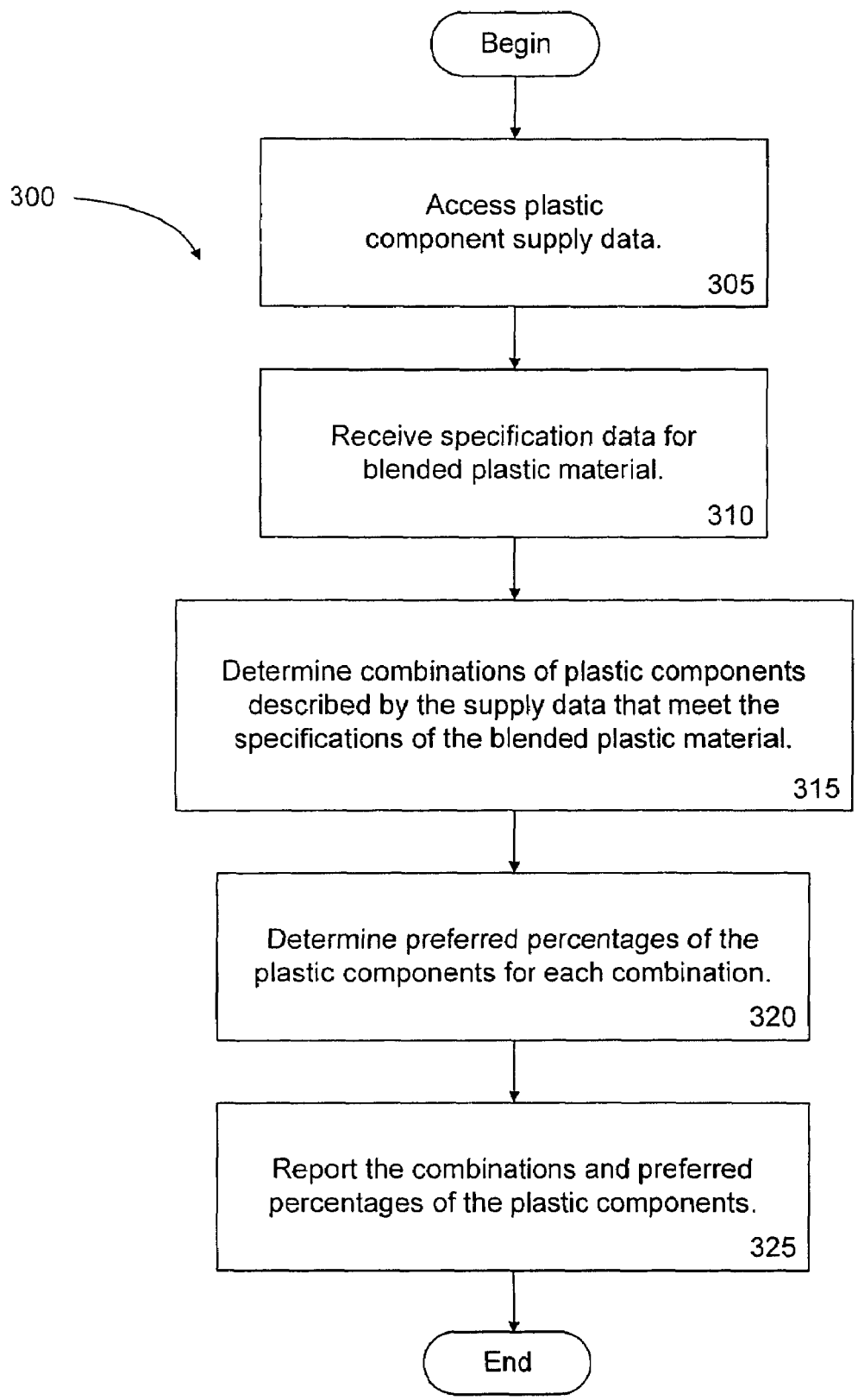
FIG. 3 is a block diagram illustrating one example methodology for determining components of a blended plastic material.

Referring now to FIG. 3, there is illustrated an example methodology 300 for determining components of a blended plastic material. At block 305, plastic component data is accessed. Such plastic component data may be maintained locally on blending computer 200 in an operating environment such as operating environment 100. Alternatively, such plastic component data may be maintained remotely, for example, on solution server 230 in an operating environment such as operating environment 150. Of course, other stores of plastic component supply data may be employed, such as a on a plastic manufacture or supplier web site or other purchasing or inventory web site.

Figure 4:
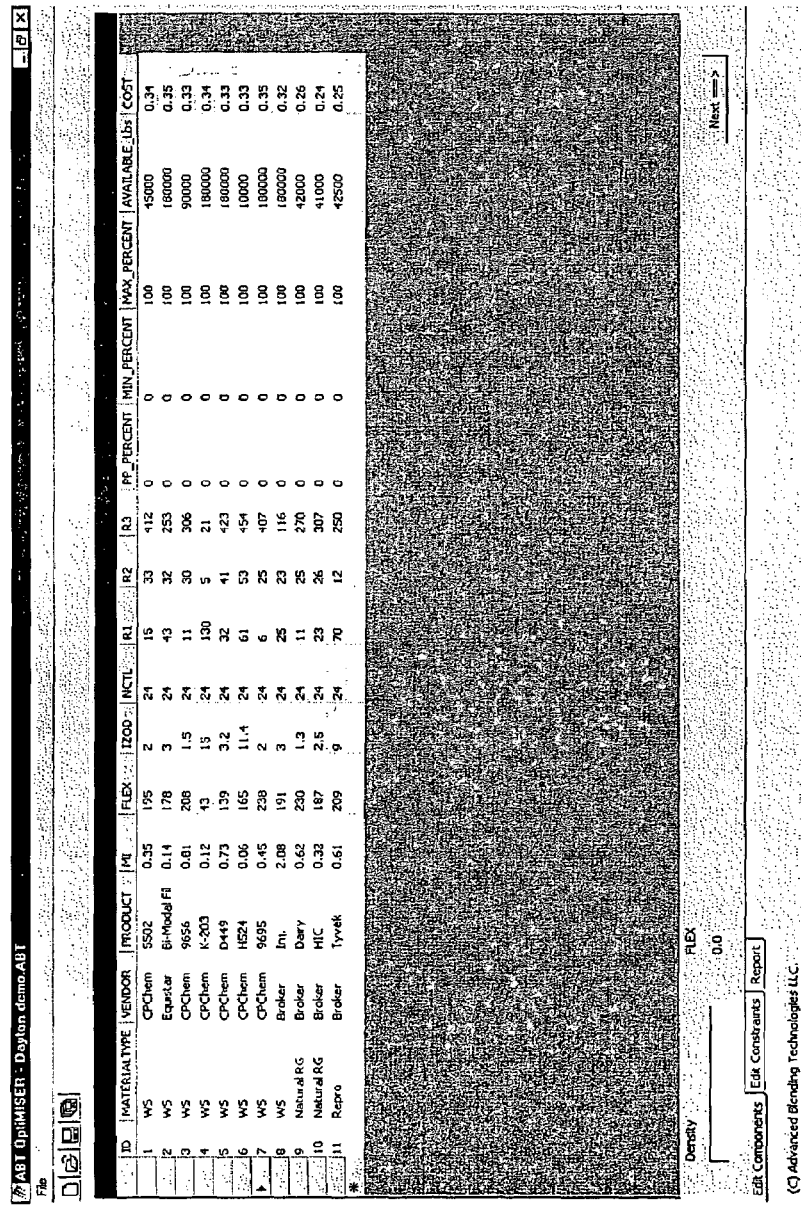
FIGS. 4–7 are example computer windows which may be employed by the control logic of the blending computer of FIG. 1A.

In an embodiment in which the component supply data is stored locally, the component supply data may be maintained in a database such as the example database illustrated by the Graphical User Interface shown in FIG. 4. FIG. 4 shows a plastic component supply database window 400 having the following fields:

| Field Name | Field Description |
|---|---|
| ID | Plastic component identifier |
| MATERIAL TYPE | Material code identifying the type of plastic, such as post-consumer, post-industrial, wide specification, regrind, reprocessed, virgin, prime, for example. |
| VENDOR | Source of the plastic component. |
| PRODUCT | Product identifier of the material |
| MI | Melt Index |
| Flex | Flexural Modulus |
| IZOD | Izod impact |
| NCTL | Notched constant tensile load |
| R1 | Rheology 1 |
| R2 | Rheology 2 |
| R3 | Rheology 3 |
| PP_PERCENT | Percent Contamination of Polypropylene |
| MIN_PERCENT | Minimum Percentage to be used in blended material |
| MAX_PERCENT | Maximum percentage to be used in blended material. |
| AVAILABLE_LBS | Amount of component material available. |
| COST | Cost per pound of component material. |

As previously described, the supply data may include descriptions of certain additives, enhancers and/or fillers which may be included in the final blended material.

Figure 5:
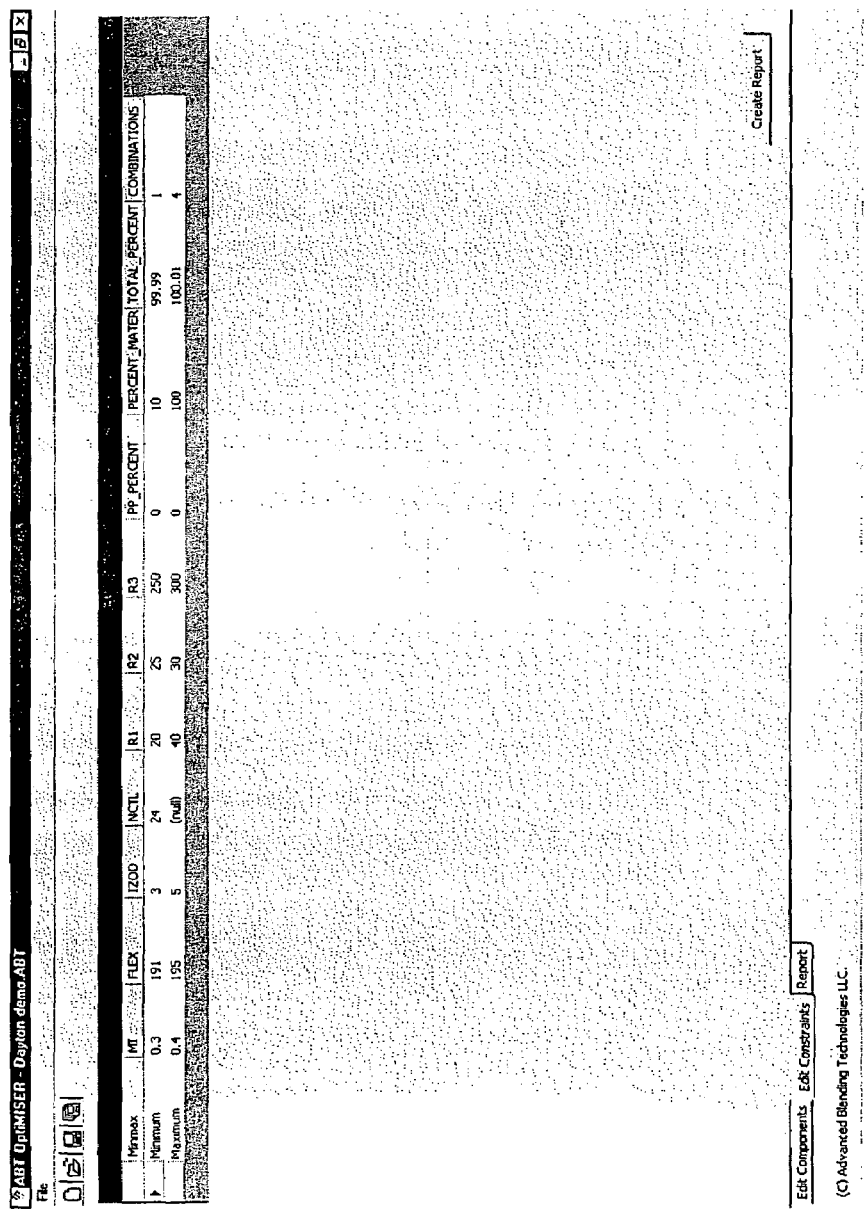

Referring now to block 310, the methodology includes receiving specification data for the blended plastic material to be created. The specification data may include a number of parameters relating to the blended plastic material, including a specification of certain physical properties for the blended plastic material. Such a specification may be provided in a variety of ways, such as absolute values, a range of absolute values or a range of percentages, for example. One example of a specification input window 500 for receiving specification data from a user is illustrated in FIG. 5. As shown, the user has requested that a blended plastic material be determined where the melt index of the blended plastic material is between 0.3 and 0.4, the flexural modulus is between 191 and 195, the IZOD is between 3 and 5. Further, the blended plastic material should have an NCTL value of at least 24, R1 should be between 20 and 40, R2 should be between 25 and 30 and R3 should be between 250 and 300. Finally, the blended plastic material may include between 1 and 4 different component materials, but no component material may be less than 10 percent.

The blended plastic material specification may be accomplished using a variety of techniques. Although ranges are illustrated in the example specification input window 500, specific target values and offsets may also be used, in addition to various other techniques known by those of skill in the art.

Figure 6:

Example methodology 300, at block 315, next determines combinations of plastic components described by the supply data that meet the specifications of the blended plastic material. At block 320, the optimum or otherwise preferred percentages of the plastic components for each combination are determined. In the example embodiment, these determinations are made according to the Simplex Method, a method of solving Linear Problems. The described example embodiment employs open source LP Solve Software. One of ordinary skill in the art would recognize a number of alternate algorithms for determining the combinations and percentages of component materials that would satisfy the specifications for the blended plastic material based on the available supply of component materials. One of ordinary skill in the art will recognize various alternate embodiments of the present invention to accomplish block 320. For example, one alternate embodiment could employ neural network technology to accomplish the step of determining the optimum or otherwise preferred percentages of the plastic components for each combination At block 325, the solutions, namely the combinations of components and percentages of each component, are reported. In one embodiment, such information is reported to the user via the GUI of the blending software application executed by blending computer 200. In such an embodiment, the various combinations may be presented in a first window, such as solution window 600 illustrated in FIG. 6. As illustrated, the projected specifications of each of the 19 determined combinations are presented, including a solution identifier, melt index, flexural modulus, density, IZOD, NCTL, various rheological characterizations, cost and weight. Of course, other projected characteristics of the combinations are possible.

Although the solutions of window 600, as illustrated, are sorted according to cost, the user may select a particular heading to resort the solutions according to another order. For example, if the user wanted to maximize the R1 value, the user could select the "R1" heading to instruct the blending application to re-sort the solutions in R1 order.

Detailed information regarding each of the 19 combinations reported in window 600 may be obtained including, for example the percentage of each component. In the present example, such detailed information may be obtained by selecting a link 610 associated with a particular solution combination.

Figure 7:
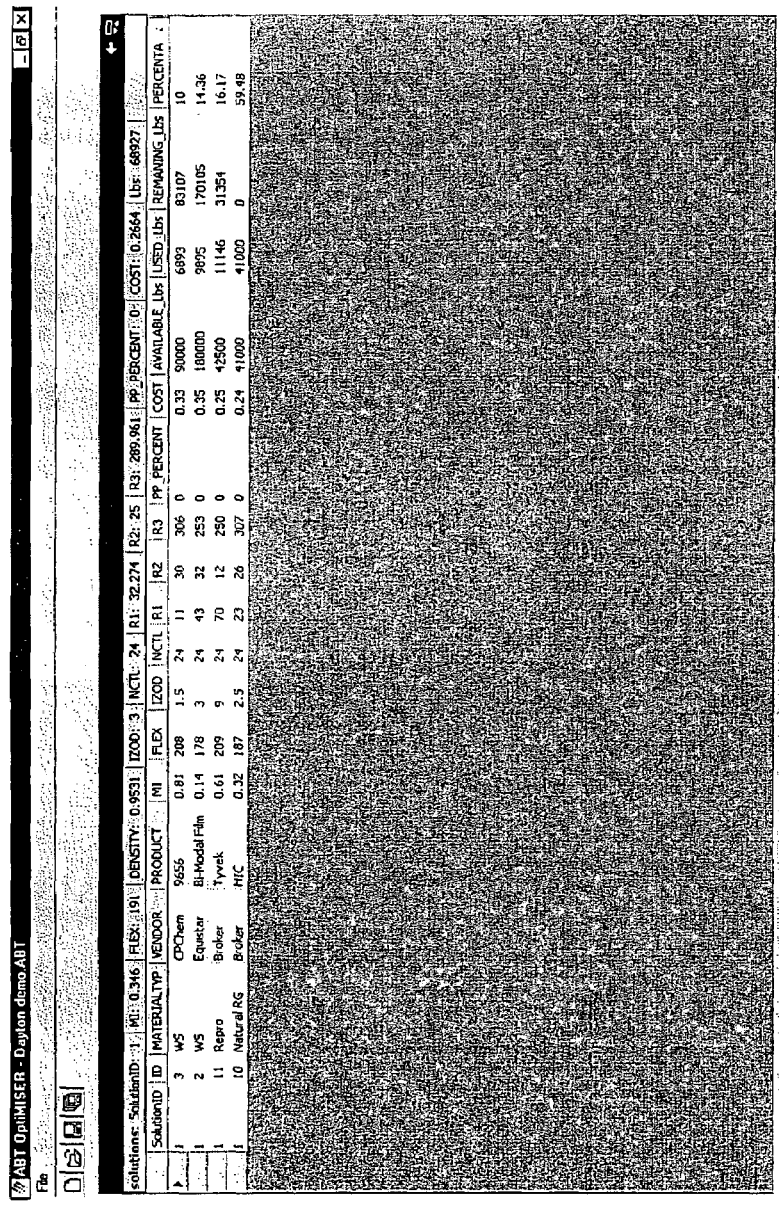

Referring now to FIG. 7, solution detail window 700 containing the detailed solution data for solution 1 is illustrated. Detailed solution data is provided for each component of the solution, including the percentage for each component material and various characteristics of each component material. Other information which may be presented in the solution detail window 700 includes the cost, available weight, amount used and the remaining supply of each component material.

Once the user is presented with a list of solutions 600 and the detail behind each solution 700, the user may select the solution that is best suits his/her needs. For example, if minimizing cost is a paramount concern, the user may elect to produce the blended plastic material of solution 1 costing 0.2664 per pound. Alternatively, if minimizing the rheological characteristic R1 is most important to the user, solution 6 may be selected. Of course, the user may have a variety of objectives which may be met in whole or in part by other solutions. The ability for the user to select from among several preferred solutions is a significant benefit. The present invention recognizes the advantage of providing more than a single "optimum" solution for the user to select from.

On-Line Supply Data

Figure 8:
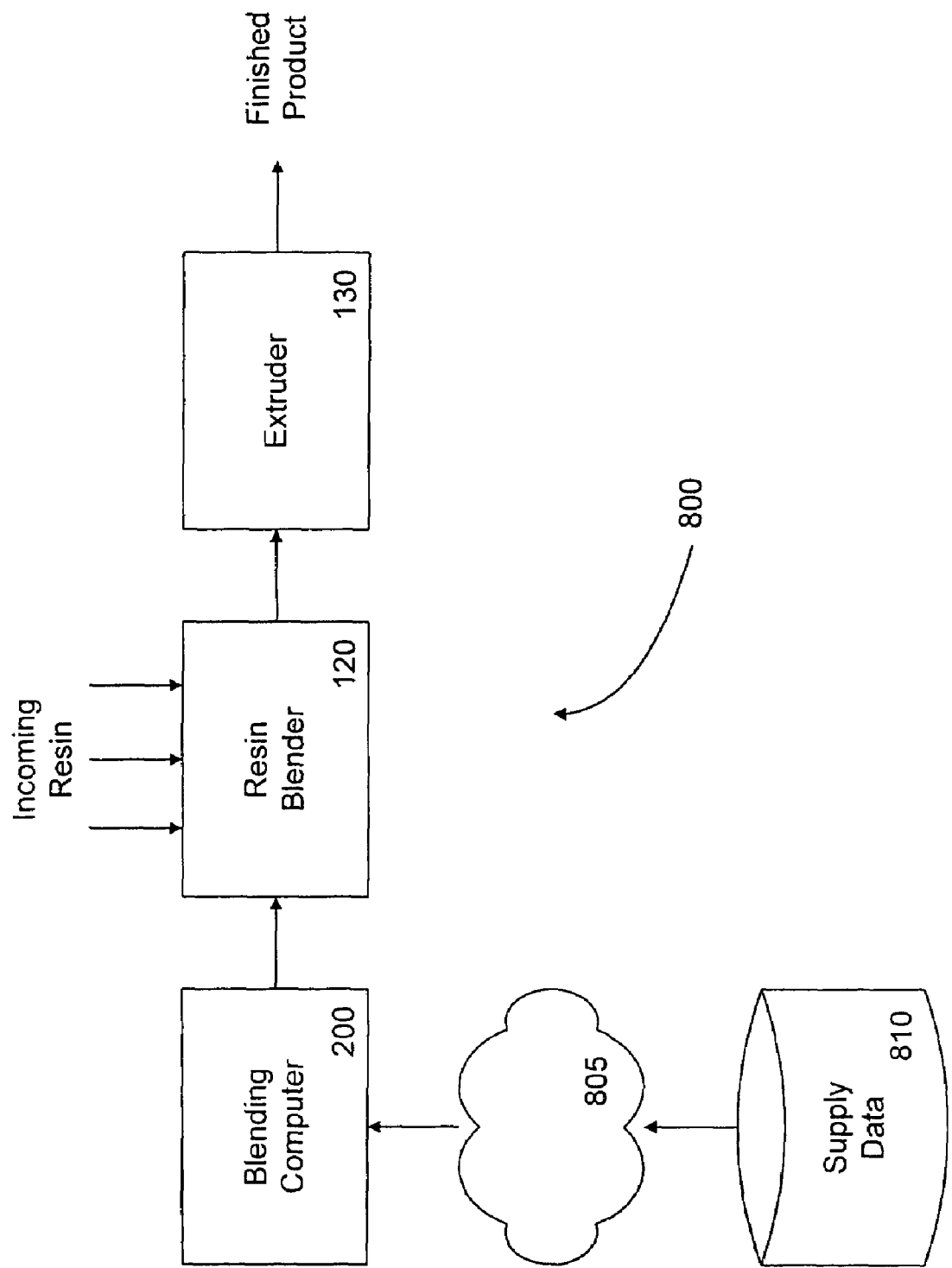
FIG. 8 is a block diagram illustrating an alternate example operating environment in accordance with the present invention.

Referring now to FIG. 8, there is illustrated an alternate environment 800 of the present invention in which the supply data may be stored remotely and/or provided by third parties. In the illustrated example, blending computer 200 accesses and retrieves supply data 810 from a third party web server via the internet 805. In the example embodiment, there is no need to test the incoming resin, as it is supplied according to specifications listed on the third party web server. Of course, hybrid environments for the present invention are also possible, such as an environment in which supply data is be stored locally as well as remotely. In such an embodiment, testing equipment such as that described with reference to FIG. 1A may be utilized with respect to the locally stored supply data.

In one embodiment, supply data 810 may be a catalog of plastic resins provided by a single supplier. In another embodiment, supply data 810 may be a listing of resins available from a variety of suppliers. In yet another embodiment, supply data 810 may be a list of resins available through auction.

Referring now to FIG. 9, an example "Edit Components" window 900 is illustrated. Window 900 provides a facility for maintaining records of the supply data 810. The supply data records of window 900 contain essentially the same fields as illustrated with respect to window 400 illustrated in FIG. 4.

Figure 10:
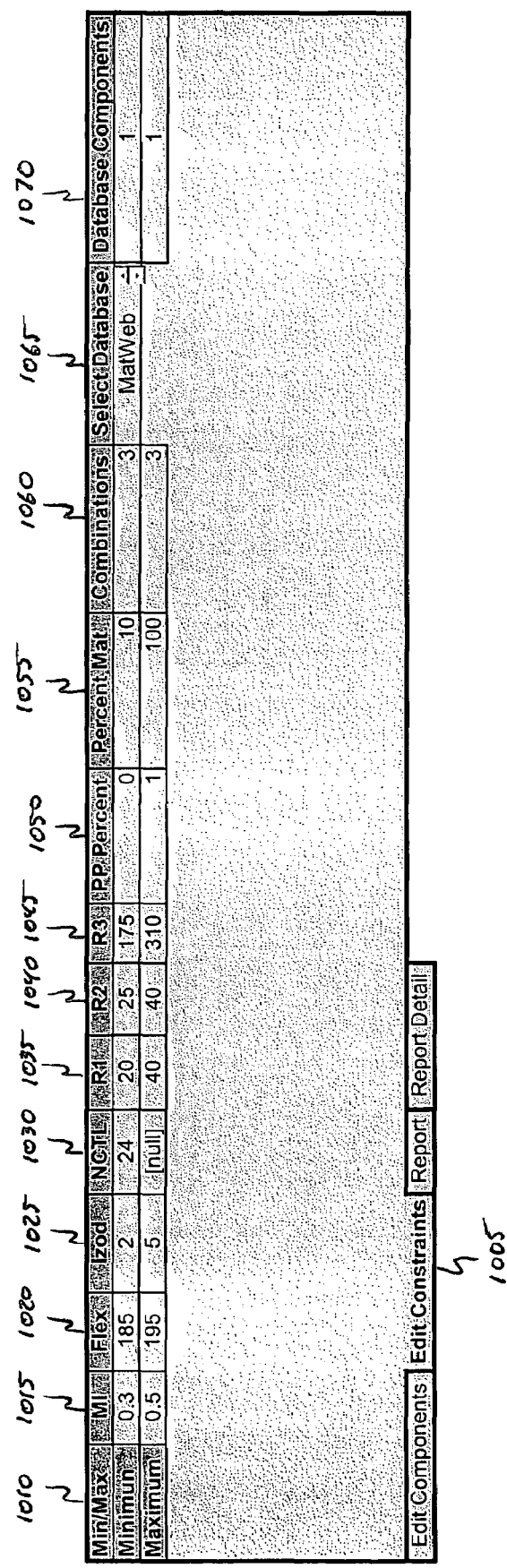

An example "Edit Constraints" window 1000 is illustrated in FIG. 10. Window 1000 enables a user to define the constraints of the blended plastic material for which components will be determined. Fields 1010–1060 are essentially the same as those illustrated with respect to window 500 in FIG. 5. "Select Database" field 1065 enables the user to identify a database which contains the supply data from which plastic components will be selected. The database identified by field 1065 may be a local database, a remote supplier database, a remote marketplace database, a remote auction database or any other type of database that a user may find useful. "Database Components" field 1070 enables the user to identify the minimum and maximum number of components which may be selected from the database identified by field 1065.

Example "Report" window 1100, illustrated in FIG. 11, presents a list of solutions which satisfy the constraints defined using window 1000. Each record in the Report window 1100 represents a particular blended plastic material solution. The detail of each solution, including the specific component plastics associated with the solution, may be viewed by the user by selecting the solution of interest and displaying the "Report Detail" window 1200 illustrated in FIG. 12.

The "Report Detail" window 1200 provides detailed solution data for each component of the selected solution, including the percentage for each component material and various characteristics of each component material. Other information which may be presented in the solution detail window 1200 includes the cost, available weight, amount used and the remaining supply of each component material.

One significant advantage of this and other aspects of the present invention is the ability to view the impact of a particular solution on the available inventory of a specific plastic component. It is intended that the solution software provide an interface with an inventory management and/or accounting application in order to provide an integrated solution. Specifically, upon determination and selection of the plastic components of a blended plastic material, the blending computer will transmit inventory data to an inventory management application to accurately reflect the effect of the selection on any available inventory. The integrated inventory management application may reside locally on the blending computer or remotely via a LAN, WAN or other network configuration.

Material Valuation Methodology

According to another aspect of the present invention, the blending computer software application enables the preferred valuation of one or more plastic components FIGS. 13–17 illustrate example windows of a user interface which may be used to embody a methodology for such plastic component valuation. FIG. 13 illustrates an example "Edit Components" window 1300 which enables a user to define and maintain the supply data describing the plastic components that may be used in determining a blended plastic material. FIG. 14 illustrates an example "Edit Constraints" window 1400 which enables the user to define the specifications, including the desired blended cost which must be met by the blended plastic material. As illustrated at 1410, a target or desired blend cost may be received from the user. In this example, the desired blend cost 1410 represents the cost of plastic components which the user can presently procure to manufacture a blended plastic material that meets the user's specifications.

Figure 15:
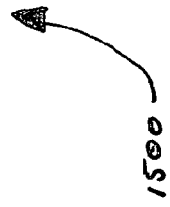

FIG. 15 illustrates an example "Component to Cost" window 1500 which enables the user to define the characteristics of a component for which the user wishes to determine a preferred cost. In the instant example, the fields defining the component to cost are substantially similar to the fields defining the supply data of window 1300. As illustrated, window 1500 does not include a cost field, because cost is variable that the instant embodiment of the material blending software application is expected to determine. Of course, an actual cost field could be included in window 1500 to provide a comparison with the preferred cost determined by the application.

Figure 16:
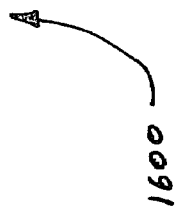

FIG. 16 illustrates an example "Report" window 1600 which provides a list of solutions, each of which includes the component to cost. Upon selecting a solution, the user may view the detail of the solution, as illustrated by example "Report Detail" window 1700 of FIG. 17. Window 1700 provides the detail regarding each component in the determined blended plastic material, including the cost of each plastic component 1710. As illustrated, for plastic components selected from the supply data, the cost field is populated based on the cost field maintained in the "Edit Components" window 1300. Regarding the plastic components defined in the "Component to Cost" window 1500, the blending application determines the highest cost at which the plastic component may be purchased to render a cost effective blended plastic material meeting the user's specifications that is less than the target or desired blend cost 1410.

As described, the present invention provides for the prediction and/or the optimization of a blended plastic material made from various component materials. The blended plastic material is determined based on certain specifications and available supply of component materials. The component materials, such as those physically received from or alternatively available from a supplier, may be classified according to various physical characteristics and costs. Each plastic component material may be tested for physical properties using an assortment of test practices. The desired blend physical properties are entered into a database accessible by a computing device. The computing device then calculates the preferred or optimal blend(s) for the desired blend physical properties from those inventory materials available, at least cost. The computing device is programmed with linear and non-linear equations.

The present invention provides significant advantages over the prior art, in which solutions were derived using manual hand calculations or through the use of a computing devise that required an iterative solution (such as an excel spread sheet), but is not designed to provide an optimal solution.

A second aspect of the present invention is a methodology which enables a value to be placed on a component based upon its attribute(s) in relation to other components and then suggests a corresponding maximum value that should be paid at current component prices. A third aspect of this invention is a methodology which determines a multi-component blend solution when one or more components is unknown. A fourth aspect of the present invention is a methodology which monitors dry or melt blends properties, compare same to initial blend specifications and as necessary refines the blend solution. This activity is done in line and on a real time basis. Accordingly, a user of the present invention derives the benefit of consistent quality control at least cost. As described, the optimized blend calculations could be made on a remote computer, available via internet access.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrations as described. Rather, it is intended that the scope of the invention be determined by the appended claims. Furthermore, the preceding description is not meant to limit the scope of the invention. Rather, the scope of the invention is to be determined only by the appended claims and their equivalents.

What is claimed is:

1. A method for determining plastic components of a blended plastic material, the method comprising:
    accessing supply data describing characteristics of each of a plurality of plastic components;
    receiving specification data identifying at least one desired characteristic of the blended plastic material;
    processing the supply data and the specification data to determine a plurality of different combinations of plastic components that may produce the blended plastic material having the at least one desired characteristic;
    determining, for at least one combination, a preferred percentage of each of the plastic components of the combination; and
    reporting at least one selected combination and the corresponding preferred percentages.

2. The method of claim 1, further including determining, for at least one combination, a set of alternative percentages associated with the plastic components of the combination.

3. The method of claim 1 wherein the determined combinations include a predetermined number of plastic components.

4. The method of claim 1 wherein the determined components include a number of plastic components within a predetermined range of numbers of components.

5. The method of claim 1, wherein the percentage of each plastic component of each combination falls within a predetermined range.

6. The method of claim 1, wherein the specification data includes a range of values associated with one characteristic.

7. The method of claim 6, wherein the specification data includes a minimum value and a maximum value representing the range.

8. The method of claim 6, wherein the specification data includes a target value and at least one offset value.

9. The method of claim 1, wherein the method is performed on a single computer.

10. The method of claim 1, wherein the supply data includes data describing at least one additive which may be used in a manufacturing process; and wherein the step of processing includes processing the supply data describing the at least one additive for potential inclusion in the blended plastic material.

11. The method of claim 1, wherein the supply data includes data describing at least one enhancer which may be included in the blended plastic material; and wherein the step of processing includes processing the supply data describing the at least one enhancer for potential inclusion in the blended plastic material.

12. The method of claim 1, wherein the supply data includes data describing at least one filler which may be included in the blended plastic material; and wherein the step of processing includes processing the supply data describing the at least one filler for potential inclusion in the blended plastic material.

13. The method of claim 1, further including
    receiving feedback data from a production monitor;
    calibrating the preferred percentages based on the feedback data to more closely match the blended plastic material to the specification data; and
    transmitting the calibrated preferred percentages to a resin blender for subsequent blending of plastic material.

14. A method for determining at least one plastic component of a blended plastic material, the method comprising:
    accessing supply data describing characteristics of each of a plurality of plastic components;
    receiving specification data identifying at least one desired characteristic of the blended plastic material;
    receiving presumed plastic component data identifying at least one plastic component presumed to be included in the blended plastic material;

processing the supply data, the presumed plastic component data and the specification data to determine a plurality of different combinations of one or more plastic components and the at least one plastic components identified by the presumed plastic component data to produce the blended plastic material having the at least one desired characteristic;

determining, for each combination, a preferred percentage of each of the plastic components of the combination and a cost associated with the combination; and reporting at least one selected combinations and the corresponding preferred percentages.

15. The method of claim 14, wherein the step of processing determines a plastic component according to at least one characteristic.

16. The method of claim 15, wherein the step of processing determines a plastic component which is not described by the supply data.

17. The method of claim 14, wherein the supply data is an external store of data.

18. The method of claim 14, wherein the accessed supply data is a subset of a larger store of supply data.

19. An apparatus for determining at least one plastic component of a blended plastic material, the apparatus comprising:
a processor; and
a memory operatively connected to the processor, said memory storing:
supply data describing characteristics of each of a plurality of plastic components;
specification data identifying at least one desired characteristic of the blended plastic material;
presumed plastic component data identifying at least one plastic component presumed to be included in the blended plastic material; and
control logic for directing the processor to:
process the supply data, the presumed plastic component data and the specification data to determine a plurality of combinations of one or more plastic components and the at least one plastic component identified by the presumed plastic component data to produce the blended plastic material having the at least one desired characteristic;
determine, for at least one combination, a preferred percentage of each of the plastic components of the combination and a cost associated with the combination; and
report at least one selected combination and the corresponding preferred percentages.

20. A computer-readable storage medium encoded with processing instructions for determining at least one plastic component of a blended plastic material, the processing instructions for directing a computer to perform the steps of:
accessing supply data describing characteristics of each of a plurality of plastic components;
receiving specification data identifying at least one desired characteristic of the blended plastic material;
receiving presumed plastic component data identifying at least one plastic component presumed to be included in the blended plastic material;
processing the supply data, the presumed plastic component data and the specification data to determine a plurality of different combinations of one or more plastic components and the at least one plastic component identified by the presumed plastic component data to produce the blended plastic material having the at least one desired characteristic; and;

determining, for at least one combination, a preferred percentage of each of the plastic components of the combination and a cost associated with the at least one combination; and reporting at least one selected combination and the corresponding preferred percentages.

21. A method for determining plastic components of a blended plastic material, the method comprising:
accessing supply data describing characteristics of each of a plurality of plastic components;
receiving specification data identifying at least one desired characteristic of the blended plastic material;
processing the supply data and the specification data to determine a plurality of different combinations of plastic components that may produce the blended plastic material having the at least one desired characteristic;
determining, for at least one combination, a preferred percentage of each of the plastic components of the combination;
reporting at least one selected combination and the corresponding preferred percentages; and
determining, for at least one combination, a second percentage of each of the plastic components of the combination, the second percentage being different from the preferred percentage for the corresponding combination.

22. The method of claim 21, wherein the supply data includes a cost associated with each plastic component and the step of determining a preferred percentage of each of the plastic components is based on a total cost of the blended plastic material produced by the combination, the total cost being the sum of the percentage cost of each plastic component of the combination, the percentage cost of each plastic component of the combination being the cost of the plastic component multiplied by the preferred percentage of the plastic component.

23. The method of claim 21, wherein the at least one characteristic of the blended plastic material includes a characteristic reflecting a physical property of the blended plastic material.

24. The method of claim 23, wherein the at least one characteristic is a physical property relating to density.

25. The method of claim 23 wherein the at least one characteristic is a grade characteristic.

26. The method of claim 21, wherein reporting at least one selected combination and the corresponding preferred percentages includes sorting and presenting the selected combinations according to a cost associated with each selected combination.

27. The method of claim 21, wherein the supply data includes an indicator of available volume for each plastic component, the method further including determining, for at least one combination of plastic components, a maximum volume of the blended plastic that can be produced based on the available volume and percentage of each plastic component in the at least one combination of plastic components.

28. The method of claim 12 wherein the steps for processing and determining are performed on a remote computer.

29. The method of claim 21, further comprising:
determining that no combination of the plastic components produces a blended plastic material having the at least one desired characteristic; and
processing the supply data and the specification data to determine at least one combination plastic components that produce a blended plastic material having a characteristic approximating the at least one desired characteristic; and;

determining, for the at least one combination, a preferred percentage of each of the plastic components of the combination.

30. The method of claim 21, further including:

receiving a selection of a desired combination of plastic components to be used to produce the blended plastic material; and transmitting the selection to an inventory management application that updates inventory quantities of components in the selected combination.

31. The method of claim 21, further including:

receiving target blended plastic material data defining the plastic components and percentages of a target blended plastic material; and wherein the step of determining includes calculating comparative cost data associated with each combination and the reporting includes reporting preferred percentages based at least in part on the target blended plastic material data.

32. A method for determining plastic components of a blended plastic material, the method comprising:

accessing supply data describing characteristics of each of a plurality of plastic components including physical properties and available volume for each plastic component;

receiving specification data identifying at least one desired physical property of the blended plastic material;

processing the supply data and the specification data to determine a plurality of different combinations of plastic components that may produce the blended plastic material having the desired physical property;

determining, for each combination, a preferred percentage of each of the plastic components of the combination based on a total cost of the blended plastic material produced by the combination, the total cost being the sum of the percentage cost of each plastic component of the combination, the percentage cost of each plastic component of the combination being the cost of the plastic component multiplied by the preferred percentage of the plastic component;

determining, for at least one combination, a second percentage of each of the plastic components of the combination, the second percentage being different from the preferred percentage for the corresponding combination;

determining for each combination, a maximum volume of the blended plastic that can be produced based on the available volume and percentage of each plastic component in the at least one combination of plastic components;

sorting the combinations according to a cost associated with each combination;

reporting the sorted combinations and the corresponding preferred percentages and maximum volume of blended plastic that can be produced according to each combination;

receiving a selection of a desired combination of plastic components to be used to produce the blended plastic material; and transmitting the selection to an inventory management application that updates the available volume of components in the selected combination.

33. Computer-readable storage media encoded with processing instructions for determining plastic components of a blended plastic material, the processing instructions for directing a computer to perform the steps of:

accessing supply data describing characteristics of each of a plurality of plastic components;

receiving specification data identifying at least one desired characteristic of the blended plastic material;

processing the supply data and the specification data to determine a plurality of different combinations of plastic components that may produce the blended plastic material having the at least one desired characteristic;

determining, for at least one combination, a preferred percentage of each of the plastic components of the combination;

reporting at least one selected combination and the corresponding preferred percentages; and determining, for at least one combination, a second percentage of each of the plastic components of the combination, the second percentage being different from the preferred percentage for the corresponding combination.

34. An apparatus for determining plastic components of a blended plastic material, the apparatus comprising:

a processor; and a memory operatively connected to the processor, said memory storing:

supply data describing characteristics of each of a plurality of plastic components;

specification data identifying at least one desired characteristic of the blended plastic material; and control logic for directing the processor to:

process the supply data and the specification data to determine a plurality of different combinations of plastic components that may produce the blended plastic material having the at least one desired characteristic;

determine, for at least one combination, a preferred percentage of each of the plastic components of the combination;

determine, for at least one combination, a second percentage of each of the plastic components of the combination, the second percentage being different from the preferred percentage for the corresponding combination; and report at least one selected combination and the corresponding preferred percentages.

* * * * *

UNITED STATES PATENT AND TRADEMARK OFFICE
CERTIFICATE OF CORRECTION

PATENT NO.        : 7,158,847 B2                                      Page 1 of 1
APPLICATION NO.   : 10/796648
DATED             : January 2, 2007
INVENTOR(S)       : Todd C. Ernst et al.

It is certified that error appears in the above-identified patent and that said Letters Patent is hereby corrected as shown below:

Col. 14, line 58, please change the number "12" to read --21--.

Signed and Sealed this

Tenth Day of April, 2007

JON W. DUDAS
*Director of the United States Patent and Trademark Office*